(12) United States Patent
O'Connor (10) Patent No.: US 8,398,015 B2
(45) Date of Patent: Mar. 19, 2013

(54) AIRCRAFT THAT CAN FLY HORIZONTALLY AND VERTICALLY

(76) Inventor: Sean O'Connor, Surrey (GB)

( * ) Notice: Subject to any disclaimer, the term of this patent is extended or adjusted under 35 U.S.C. 154(b) by 0 days.

(21) Appl. No.: 11/631,925

(22) PCT Filed: Jul. 6, 2005

(86) PCT No.: PCT/GB2005/002671
§ 371 (c)(1),
(2), (4) Date: Sep. 11, 2007

(87) PCT Pub. No.: WO2006/003459
PCT Pub. Date: Jan. 12, 2006

(65) Prior Publication Data
US 2008/0073458 A1 Mar. 27, 2008

(30) Foreign Application Priority Data

Jul. 6, 2004 (GB) ................................. 0415173.4
Jul. 16, 2004 (GB) ................................. 0416002.4

(51) Int. Cl.
*B64C 39/00* (2006.01)
(52) U.S. Cl. ............................... 244/9; 244/19; 244/70
(58) Field of Classification Search ............... 244/9, 19, 244/70, 12.1, 12.3, 23 B
See application file for complete search history.

(56) References Cited

U.S. PATENT DOCUMENTS

| 1,049,117 | A | * | 12/1912 | Marek | 244/9 |
| 1,086,199 | A | * | 2/1914 | Metcalf | 244/9 |
| 1,304,187 | A | * | 5/1919 | Lind | 244/70 |
| 1,529,869 | A | * | 3/1925 | Burrill | 244/19 |
| 1,631,861 | A | * | 6/1927 | Hanschke | 244/9 |
| RE18,882 | E | * | 6/1933 | Darbyson | 244/9 |
| 2,032,848 | A | * | 3/1936 | Kutnar | 244/9 |
| 3,868,073 | A | * | 2/1975 | King | 244/34 A |
| 4,194,707 | A | * | 3/1980 | Sharpe | 244/9 |
| 5,954,295 | A | * | 9/1999 | Olson | 244/9 |
| 6,845,940 | B2 | * | 1/2005 | Hashimoto | 244/9 |

FOREIGN PATENT DOCUMENTS

| DE | 1481946 | 7/1966 |
| FR | 13495054 | 1/1964 |
| GB | 1529869 | 8/1923 |
| GB | 250313 | 1/1925 |
| GB | 273524 | 8/1926 |
| GB | 333680 | 1/1929 |
| GB | 691117 | 5/1951 |
| GB | 2325203 | 5/1997 |
| WO | WO2004/054875 | 7/2004 |
| WO | WO2004/074680 | 9/2004 |

OTHER PUBLICATIONS

Written Opinion and Search Report of PCT/GB2005/002671 (4 pages). International Search Report of PCT/GB2005/002671 (4 pages).
GB Search Report for GB 416002.4 (1 page).

* cited by examiner

*Primary Examiner* — Philip J Bonzell
(74) *Attorney, Agent, or Firm* — Andrew F. Young, Esq.; Lackenbach Siegel, LLP (57) ABSTRACT

An aircraft that has a set of wings which spin about respective axes that are laterally spaced apart in a horizontal plane of the aircraft, parallel to each other, and positioned adjacent respective frame portions, each of said frame portions defining a continuous surface, having a semi-circular cross-section means being provided to drive the sets of wings so that, as they spin, each wing of said sets of wings moves sequentially upwards inside its respective frame portion, and downwards outside its respective frame portion so as to provide lift to the aircraft.

17 Claims, 7 Drawing Sheets

AIRCRAFT THAT CAN FLY HORIZONTALLY AND VERTICALLY

CROSS REFERENCE FOR PRIORITY

This application claims priority from PCT/GB2005/002671 filed Jul. 6, 2005, which claims priority from GB 0415173.4 filed Jul. 6, 2004 and GB 0416002.4 filed Jul. 16, 2004, the contents of each of which are herein incorporated by reference.

BACKGROUND OF THE INVENTION

Field of the Invention

The present invention relates to an aircraft. More specifically, the present invention relates to an aircraft having a set of wings spinning about respective axes.

OBJECTS AND SUMMARY OF THE INVENTION

The present invention relates to an aircraft that has a set of wings which spin about respective axes that are laterally spaced apart in a horizontal plane of the aircraft, parallel to each other, and positioned adjacent respective frame portions, each of said frame portions defining a continuous surface, having a semi-circular cross-section means being provided to drive the sets of wings so that, as they spin, each wing of said sets of wings moves sequentially upwards inside its respective frame portion, and downwards outside its respective frame portion so as to provide lift to the aircraft.

According to one embodiment of the present invention, there is provided an aircraft comprising: sets of wings which spin about respective axes that are laterally spaced apart in a horizontal plane of the aircraft, parallel to each other, and positioned adjacent respective frame portions; each of said frame portions defining a continuous surface, having a semi-circular cross-section, the cross-section extending from a point directly above the axis of its respective wing, and to a position directly below the same axis; the cross-section extending from a point directly above the axis of its respective wing, and to a position directly below the same axis; and means being provided to drive the sets of wings so that, as they spin, each wing of said sets of wings moves sequentially upwards inside its respective frame portion, and downwards outside its respective frame portion so as to provide lift to the aircraft.

According to another embodiment, there is provided an aircraft further comprising at least one wing which does not spin.

DETAILED DESCRIPTION OF THE PREFERRED EMBODIMENTS

According to the present invention there is provided an aircraft that comprises sets of wings which spin about respective axes that are laterally spaced apart in a horizontal plane of the aircraft, parallel to each other, and positioned adjacent respective frame portions, each of said frame portions defining a continuous surface, having a semi-circular cross-section, the cross-section extending from a point directly above the axis of its respective wing, and to a position directly below the same axis, means being provided to drive the sets of wings so that, as they spin, each wing of said set of wings moves sequentially upwards inside its respective frame portion, and downwards outside respective frame portion so as to provide lift to the aircraft.

FIGS. 1-8 all relate to a single embodiment of the invention; some features essential to the invention have been omitted from some of the figures so as to allow a clearer understanding of the features shown.

Figure 1:
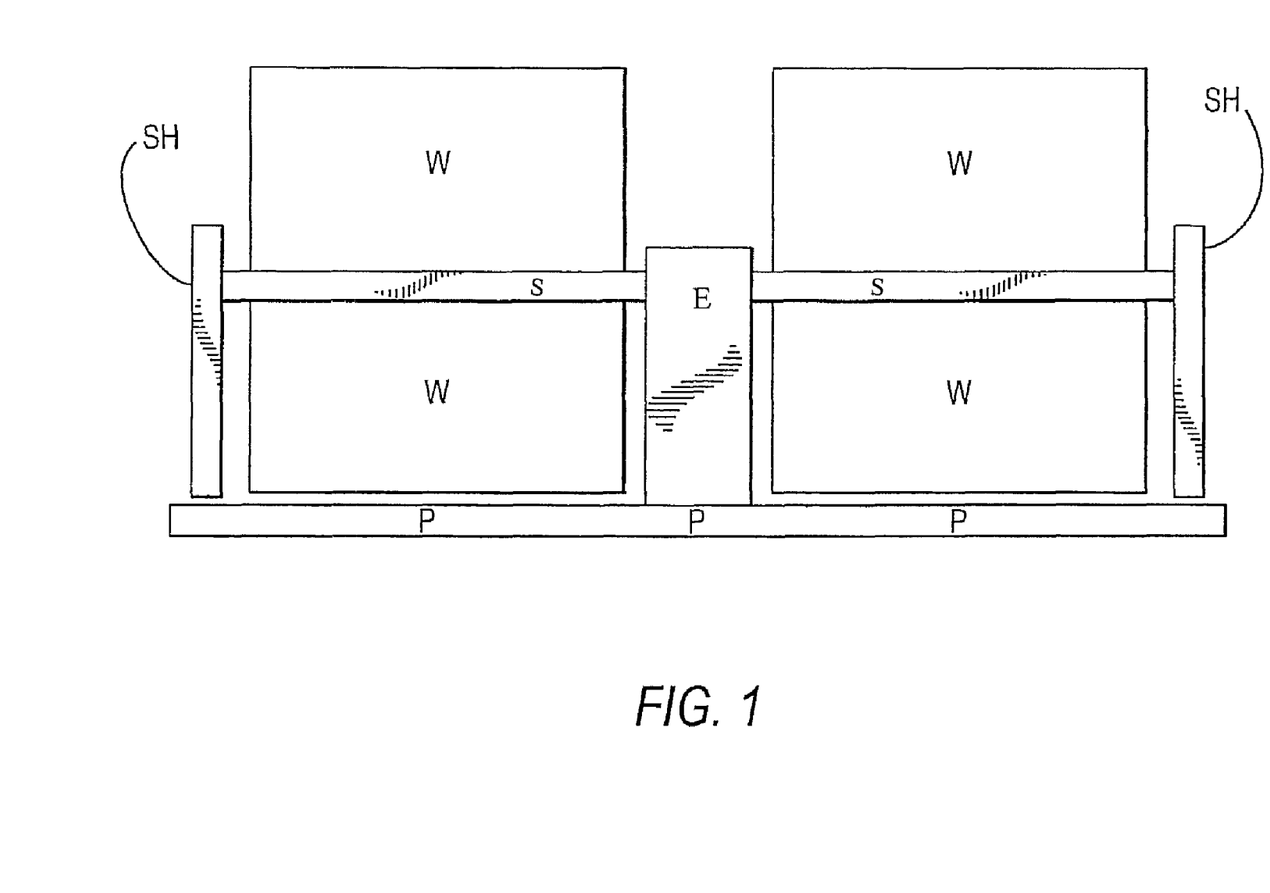
FIG. 1 is a side view of a top half of an aircraft according to the present invention.

FIG. 1 shows a side view of the top half of the aircraft. An engine (E) is connected to two shafts (S). Each shaft is connected to a pair of wings (W). The end of each shaft which is furthest from its engine is held by a shaft-holder (SH). The engine and each shaft-holder are supported by a platform (P).

Each shaft and its wings are rotated by the engine. The size, shape, number, mountings and positions of every engine on the aircraft are optional, as are the size, shape, number, mountings and positions of every wing.

Figure 2:
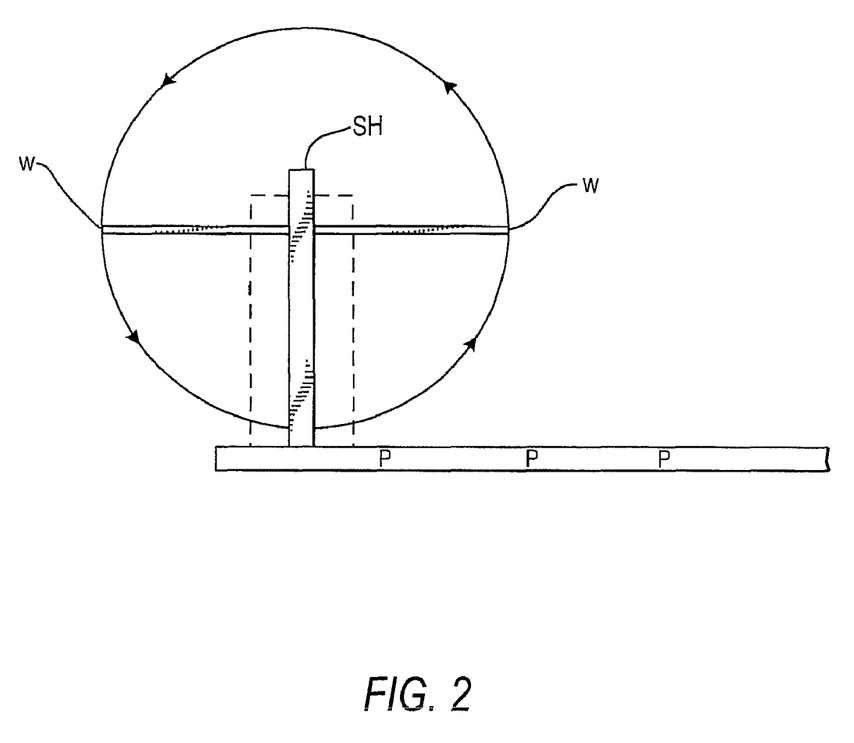
FIG. 2 is a front view of an aircraft as in FIG. 1.

FIG. 2 shows a head on view of a pair of wings which are rotating. The wings here are flat, but they could also be bent or curved to gain better purchase on air.

Figure 3:
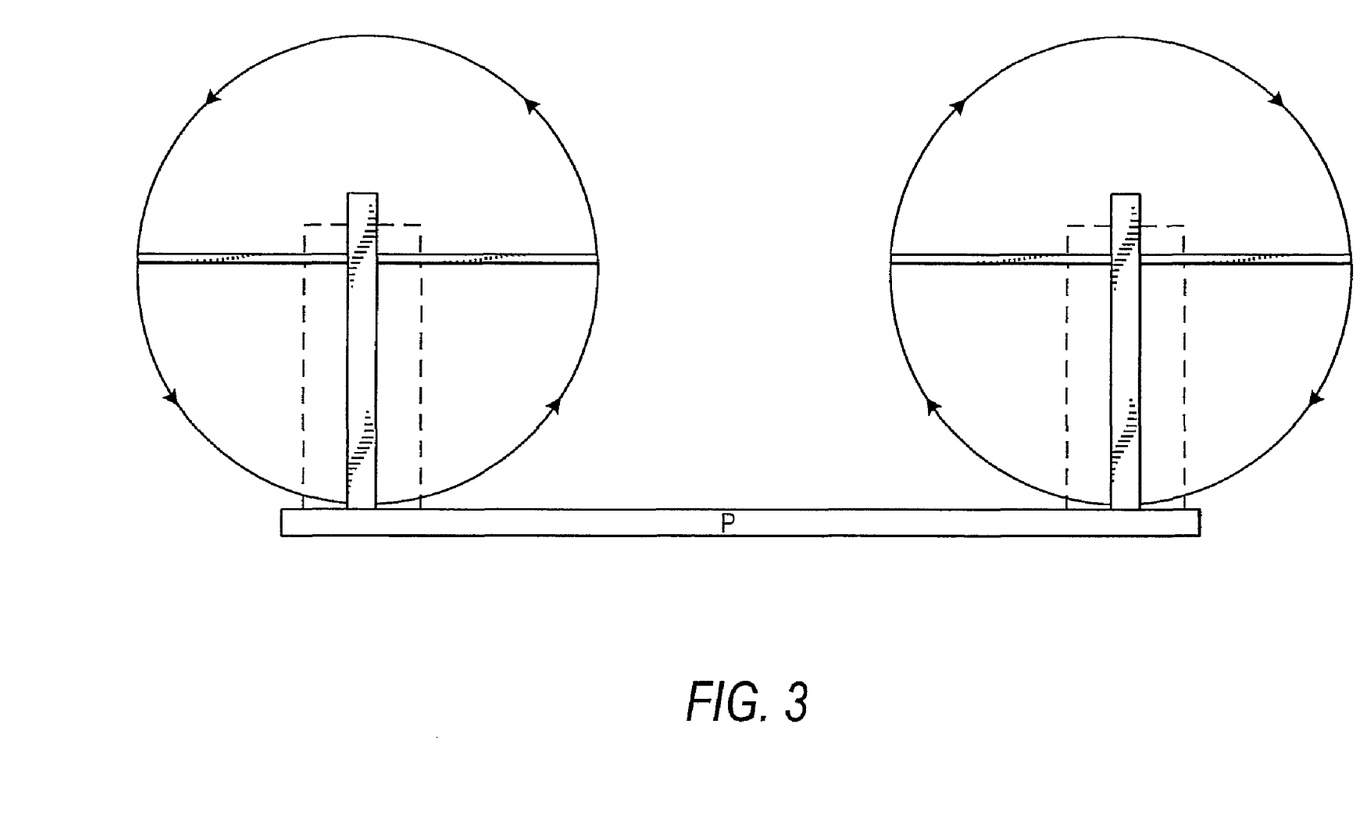
FIG. 3 is a view of another engine and another two pair of wings added on the other side of the aircraft.

FIG. 3. Another engine and another two pairs of wings are added on the other side of the aircraft.

Figure 4:
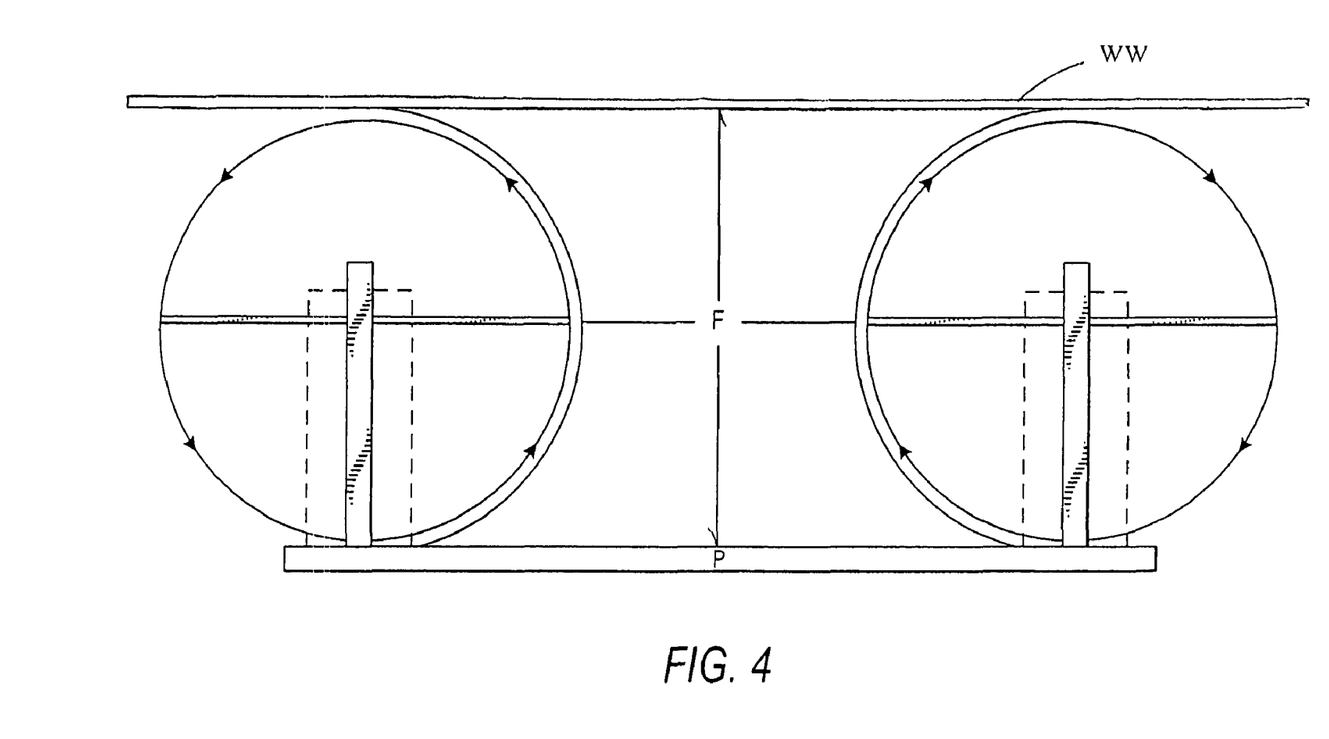
FIG. 4 is a front view of rotating wings.

FIG. 4. The rotating wings, when in the outside positions, are unimpeded and provide lift.

The wings in the inside positions are enclosed inside semi-circular frames (F) which may, as here, be linked to each other by horizontal frames (F). The upper horizontal frame may be used as a wing (WW). The platform (P) may be used as wings.

Figure 5:
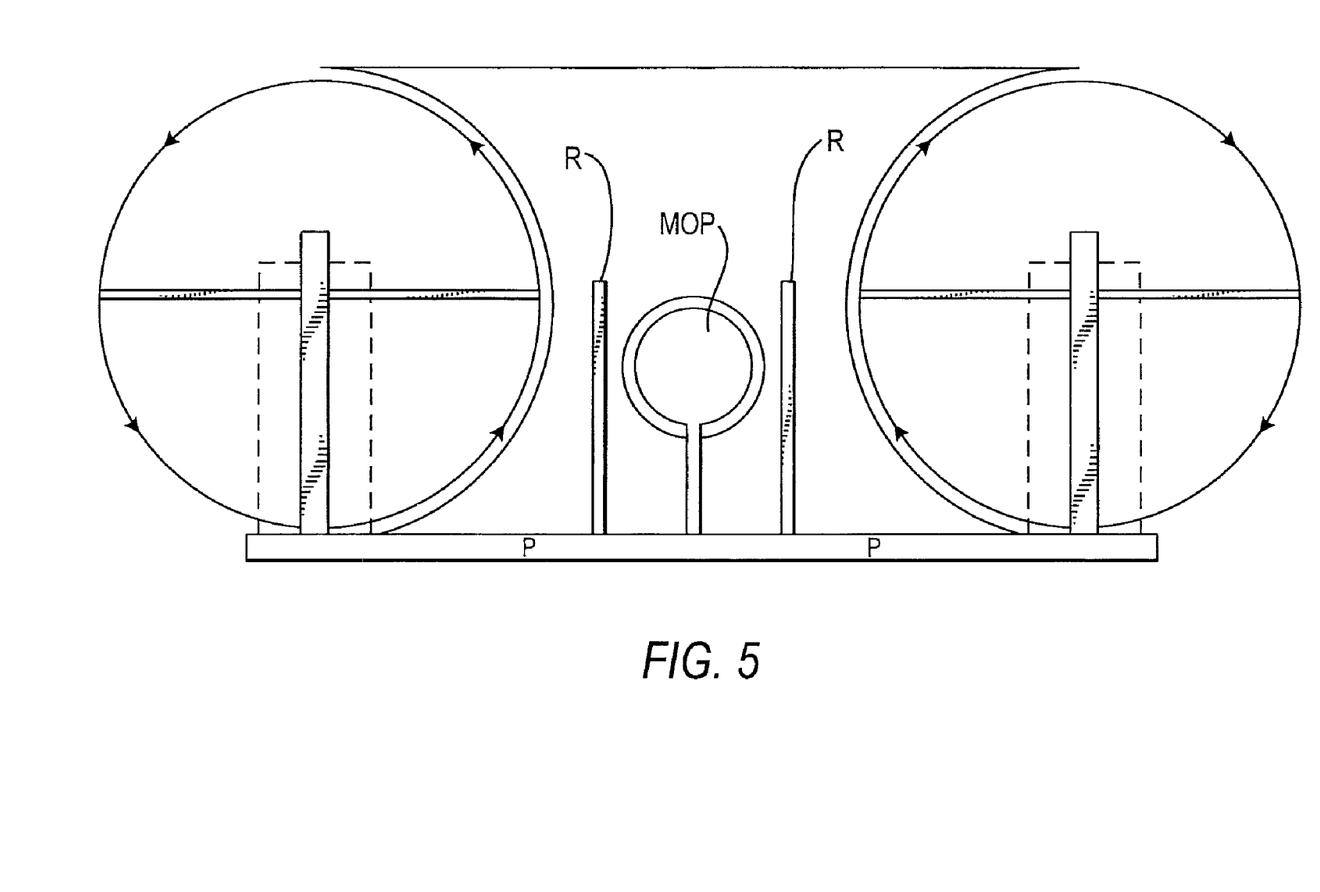
FIG. 5 is a front view of a propulsion means, such as a jet or propeller engine.

FIG. 5 denotes the addition of a means of propulsion (MOP)—maybe a jet or propeller engine. As a means of steering, a pair of rudders (R) may be added or the means of propulsion may be rotated. If propellers are the MOP, they may be rotated by the engines which rotate the wings.

Figures 6, 7:
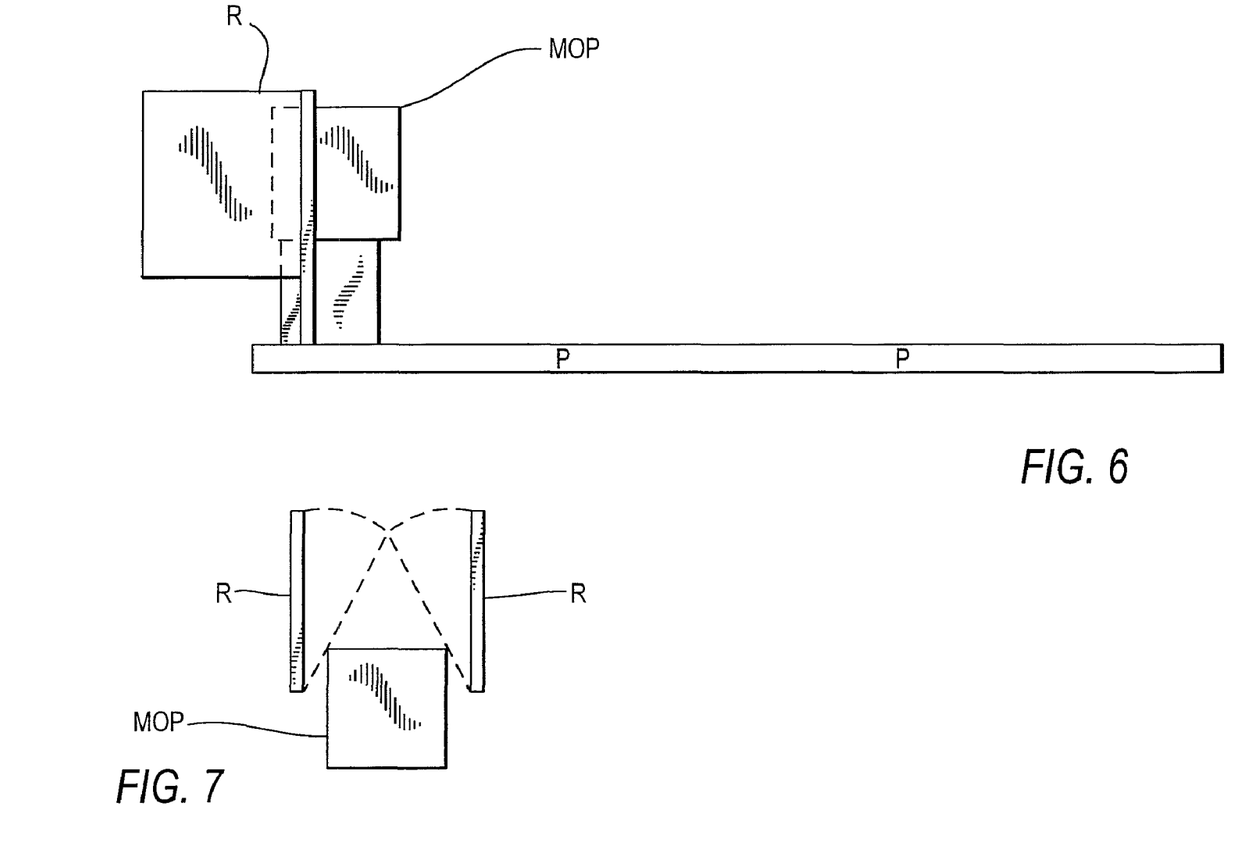
FIG. 6 is a side view indicating a breaking arrangement.
FIG. 7 is a the proposed braking system as seen from above.

FIG. 6 shows how braking may be achieved. The rudders (R) can be rotated inwards into the blast of air or gases from the means of propulsion (MOP). Braking may also be achieved by reversing the thrust of the MOP. FIG. 6 shows braking system from side.

FIG. 7 shows the braking system as seen from above. The rudders (R) may be heat resistant.

Figure 8:
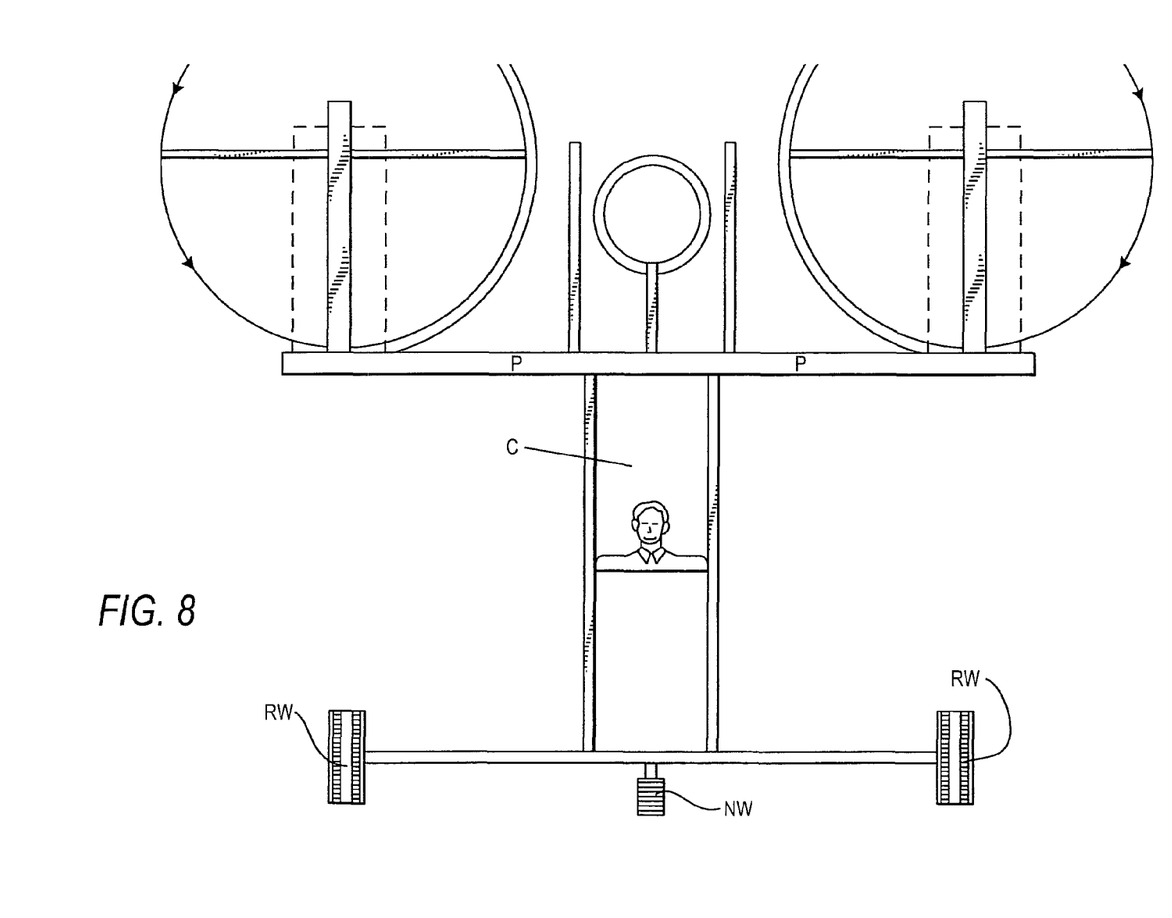
FIG. 8 is a front view of an aircraft.

FIG. 8 shows the aircraft as seen from the front. The number of passengers and/or crew carried in the cabin (C) is optional. In FIG. 8 the aircraft has two rear wheels (RW) and one nose wheel (NW). This arrangement can be varied.

In another embodiment of the aircraft, the shafts (S) are extended through the shaft holders, and an additional pair of wings added to each extension so that each engine is rotating eight wings instead of four.

In a further embodiment, the upper horizontal frame is extended on both sides of the aircraft to provide additional wing surface area.

In a still further embodiment, retractable wings are installed within the platform (P) such that they can be extended to provide increased wing surface area during flight. It should be noted that these wings must be retracted within the platform during use of the rotating wings (W), in order that the rotating wings are able to generate lift.

For smaller versions of the aircraft, a parachute can be added at the top of the aircraft as a safety measure, to be deployable in the event of engine failure.

In a yet further embodiment, two engines are used on each side of the aircraft, rather than a single engine on each side of the aircraft as shown in FIG. 1. In this manner, if one engine fails on one side of the aircraft, the second engine can still provide power to its own rotating wings.

On larger versions of the aircraft, further engines can be added to each side of the aircraft as appropriate.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

The invention claimed is:

1. An aircraft capable of vertical and horizontal flight without use of a fixed wing, the aircraft comprising:
  one or more means of propulsion for achieving horizontal flight;
  an aircraft cabin generally having a front end, a rear end, a top side and a bottom side;
  at least two sets of wings for achieving vertical lift configured to rotate about respective axes in a horizontal plane that are:
    (i) laterally spaced apart in a horizontal plane of the aircraft,
    (ii) parallel to each other, and
    (iii) positioned adjacent one or more frame portions;
  wherein each said set of wings is controlled independently of each other said set of wings;
  each of said one or more frame portions defining a continuous surface, having a semi-circular cross-section, the semi-circular cross-section extending from a point directly above the axis of its respective wing, and to a position directly below the same axis, at least two of said semi-circular frame portions being connected by a stationary horizontal frame member; and
  an engine for driving each of said at least two sets of wings so that, as they spin, each said wing moves sequentially upwards inside its respective frame portion, and downwards outside its respective frame portion to drive air in a downward direction thereby providing vertical lift for the aircraft.

2. The aircraft as claimed in claim 1, further comprising:
  means for rotating a pair of opposed rudders toward said means of propulsion whereby a breaking is achieved; and
  wherein said one or more means of propulsion are positioned between at least one of said sets of wings spacing opposed rudders proximate said means of propulsion.

3. The aircraft as claimed in claim 1, wherein said at least two sets of wings are positioned above said stationary horizontal frame member.

4. The aircraft as claimed in claim 1, wherein said means of propulsion is used for slowing said aircraft.

5. The aircraft as claimed in claim 1, wherein said frame portions are connected on top ends by a second stationary horizontal frame member and connected on bottom ends by said stationary horizontal frame member.

6. The aircraft as claimed in claim 1, wherein said one or more means of propulsion are selected from the group consisting of jet engines and engines capable of rotating propellers.

7. The aircraft as claimed in claim 1, wherein said at least two sets of wings are flat.

8. An aircraft capable of vertical and horizontal flight without use of a fixed wing, said aircraft comprising:
  an aircraft cabin generally having a front end, a rear end, a top side and a bottom side;
  a wing frame attached to said top side of said cabin, said wing frame comprising a stationary horizontal frame member, and first and second frame portions having semi-circular cross-sections, the cross-sections extending from a point directly above the axis of its respective wing, and to a position directly below the same axis;
  one or more means of propulsion for the purpose of achieving horizontal flight;
  at least two sets of wings which spin about respective axes that are laterally spaced apart in a horizontal plane of the aircraft, parallel to each other, and positioned adjacent said respective frame portions, wherein each said wing extends in directions both perpendicular and parallel with said cabin, wherein each said set of wings is controlled independently of each other said set of wings; and
  means for driving the at least two sets of wings so that, as they spin, each wing of said one or more sets of wings moves sequentially upwards inside its respective frame portion, and downwards outside its respective frame portion to drive air in a downward direction in order to provide vertical lift to the aircraft.

9. The aircraft as claimed in claim 8, further comprising:
  means for rotating opposed rudders toward said means of propulsion whereby a braking is a achieved;
  wherein at least one of said one or more means of propulsion is between at least one of said sets of wings spacing opposed rudders proximate said means of propulsion.

10. The aircraft as claimed in claim 8, wherein said at least two sets of wings are positioned above said stationary horizontal frame member.

11. The aircraft as claimed in claim 8, wherein said horizontally configured engine is used for slowing said aircraft.

12. The aircraft as claimed in claim 8, wherein said semi-circular frame portions are connected on top ends by a second stationary horizontal frame member and connected on bottom ends by said stationary horizontal frame member.

13. The aircraft as claimed in claim 8, wherein said one or more means of propulsion are selected from the group consisting of jet engines and engines capable of rotating propellers.

14. An aircraft capable of vertical and horizontal flight without use of a fixed wing, said aircraft comprising:
  an aircraft cabin having a front and rear defining a front to back direction extending between the front and the rear of said aircraft cabin and a side to side direction perpendicular to said front to back direction;
  at least two sets of left and right wings mounted on top of said cabin, wherein said sets of wings are connected to said cabin by a horizontal frame member, wherein each said wing is rotatably supported so as to be rotatable about an axis extending in said front to back direction such that said aircraft can achieve vertical lift, and wherein each said set of wings is controlled independently of each other said set of wings;
at least one means of propulsion between at least one of said sets of wings spacing opposed rudders proximate said means of propulsion; and
means for driving the at least two sets of wings so that, as they spin, each wing of said one or more sets of wings moves sequentially upwards inside its respective frame portion, and downwards outside its respective frame portion in order to drive air in a downward vertical direction so as to provide lift to the aircraft.

15. The aircraft as claimed in claim 14, further comprising:
means for rotating said opposed rudders toward said means of propulsion whereby a breaking is a achieved.

16. The aircraft as claimed in claim 14, wherein said at least two sets of wings are positioned above said stationary horizontal frame member.

17. The aircraft as claimed in claim 14, wherein said at least one means of propulsion is selected from the group consisting of jet engines and engines capable of rotating propellers.

* * * * *

UNITED STATES PATENT AND TRADEMARK OFFICE
CERTIFICATE OF CORRECTION

PATENT NO. : 8,398,015 B2
APPLICATION NO. : 11/631925
DATED : March 19, 2013
INVENTOR(S) : Sean O'Connor It is certified that error appears in the above-identified patent and that said Letters Patent is hereby corrected as shown below:

In the Specifications

In Column 1, Line 65, "breaking" should be changed to --braking--.

In the Claims

In Column 3, Claim 2, line 54, "breaking" should be changed to --braking--.

In Column 6, Claim 15, line 3, "breaking" should be changed to --braking--.

Signed and Sealed this
Ninth Day of July, 2013

Teresa Stanek Rea
*Acting Director of the United States Patent and Trademark Office*